United States Patent [19]

Anderson

[11] 4,218,842

[45] Aug. 26, 1980

[54] INSECT TRAP ASSEMBLAGE

[76] Inventor: Ray A. Anderson, P.O. Box 5512, San Jose, Calif. 95110

[21] Appl. No.: 948,685

[22] Filed: Oct. 5, 1978

[51] Int. Cl.³ .............................................. A01M 1/10
[52] U.S. Cl. ...................................... 43/122; 215/321
[58] Field of Search ................. 43/107, 121, 122, 131; 222/519, 553; 215/321

[56] References Cited

U.S. PATENT DOCUMENTS

| 1,042,448 | 10/1912 | Kane ..................................... 222/553 |
| 1,760,946 | 6/1930 | Hammerstein ........................ 222/519 |
| 1,772,729 | 8/1930 | Pisani ..................................... 43/107 |
| 2,014,500 | 9/1935 | Lass ....................................... 43/122 |
| 2,764,840 | 10/1956 | Mayfield .............................. 43/131 |
| 2,770,066 | 10/1956 | O'Sullivan ............................ 43/107 |
| 2,998,893 | 9/1961 | Thomas ................................ 215/321 |

FOREIGN PATENT DOCUMENTS

| 525188 | 5/1956 | Canada ..................................... 43/122 |
| 85185 | 3/1955 | Norway ..................................... 43/122 |
| 7121 | of 1914 | United Kingdom ..................... 43/107 |
| 1391643 | 4/1975 | United Kingdom ..................... 43/107 |

Primary Examiner—Nicholas P. Godici
Assistant Examiner—K. Bradford Adolphson
Attorney, Agent, or Firm—Phillips, Moore, Weissenberger, Lempio & Majestic

[57] ABSTRACT

An insect trap is provided for use in combination with an open mouthed receptacle such as a conventional canning jar. The insect trap comprises a tubular core member extending a predetermined distance into the receptacle as a passageway for insects such as houseflys, and a cap member into which the core member slides, and in which the core member is snappingly held. The core and cap members each include opposed orifices which, when aligned, permit entry of insects, particularly flying insects, into the receptacle via the passageway. The insect trap also includes a member for suspending the core and cap member assemblage in the receptacle mouth. Also preferably included are guide members associated with the cap and core members so that the orifices in the assemblage are correctly aligned without requiring visual acuity.

6 Claims, 4 Drawing Figures

INSECT TRAP ASSEMBLAGE

BACKGROUND OF THE INVENTION

1. Field of the Invention

This invention is concerned with the insect traps, and particularly with traps for flying insects such as houseflys.

2. Prior Art

A variety of insect traps are known to the art. Broadly, such traps may be characterized as primarily adapted for crawling insects particularly responsive to odors or for flying insects particularly responsive to both odors and light. Among the traps for crawling insects, such as ants, is the apparatus disclosed in British Pat. No. 1,391,643.

Among the traps suitably primarily for flying insects have been a variety of traps adapted for use with an open mouthed receptacle, sometimes a conventional canning jar, such as disclosed in: U.S. Pat. No. 1,772,729; British Pat. No. 7,121; and Norwegian Pat. No. 85,185.

The prior art insect traps, however, have disadvantages in use such as undesirably attracting crawling insects, for example ants, by the sweet smelling bait taught necessary to lure the flying insects through the structural intricacies of the trap, requiring that the traps contain liquid to drown the trapped insects before they otherwise escape from the simplicities of the trap, requiring poisoned bait, or requiring visual acuity for proper assemblage and subsequent attention by the person employing the trap.

Relatively simple flying insect traps are known wherein the flying insects enter holes in closed top tubular member, suspended in a jar mouth by a screen or the like, proceed downwardly into the jar and cannot find their way back out. Such prior art traps are generally relatively expensive to manufacture, particularly since attachment to the screen is generally accomplished by hand using tape, glue or the like. In some cases screen attachment is not provided and the tubular member has a larger external dimension near its top whereby it is loosely held in a hole in the screen. This has the serious disadvantage of making the tubular member relatively easy to accidently displace from its use position. Such non-screen attached tubular members have been made in two pieces with a cap snapping in place over a tube, with both the cap and tube having pairs of aligned orifices and with the skirt of the cap providing the larger external dimension of the tubular member which sits upon the screen. However, such snapping in place has not automatically aligned the orifices in the cap and tube. Thus, assembly requires considerable time and visual acuity thereby increasing production time and costs. Thus, although such traps are efficient non-polluting and ecologically desirable, they have not been available as low cost mass produced items.

Accordingly, the present invention is designed to provide an insect trap suitable particularly for flying insects which is useful in combination with a conventional, open mouthed receptacle, as well as providing a trapping assemblage which is inexpensive to manufacture, rapidly and simply assembled without requiring visual acuity by the person assemblying the trap, will not be easily displaced from its use position, and which does not create additional insect nuisances or hazards to humans.

SUMMARY OF THE INVENTION

The insect trap of the present invention is useful in combination with an open mouthed receptacle. The inventive trap comprises a tubular core member and a cap member which are held together in assemblage and properly aligned by detent means and suspended in the receptacle mouth by suspending means.

Both the core and cap members include at least one pair of opposed orifices through which insects may be admitted into the core member, which defines a passageway, and thence into the receptacle.

The suspending means holds the cap member outward from the receptacle while the core member extends into the receptacle, and also prevents insect passage out of the receptacle except through the passageway.

DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
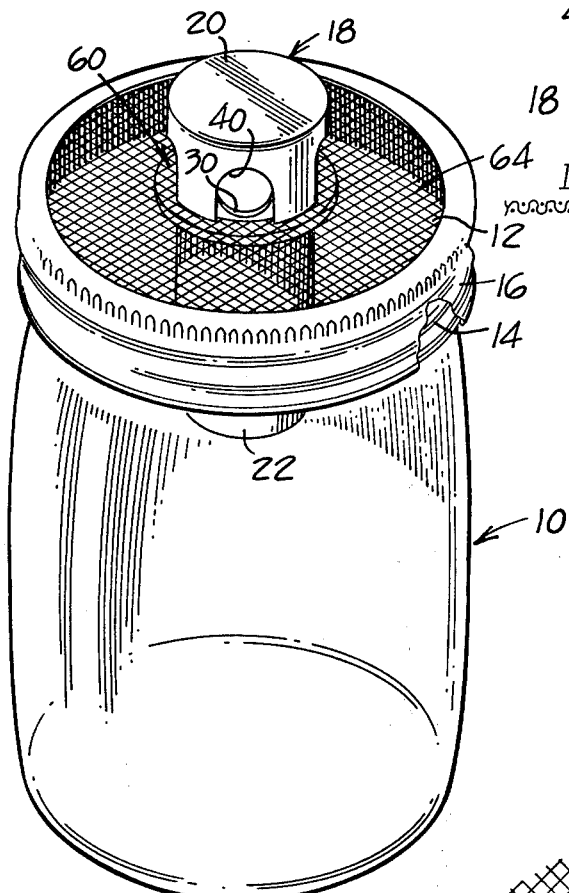
FIG. 1 illustrates a front, partially sectioned perspective view of an open mouthed receptacle in combination with the present invention.

Turning to FIG. 1, a receptacle 10 with an open mouth 12 is illustrated in combination with an insect trap 18 of the present invention. Receptacle 10 may be any conventional jar, preferably a canning jar with screw threads 14 circumferential about the exterior of mouth 12. As is well known in the art, such canning jars are sealable, in part, by use of a conventional sealing ring 16. Although the insect trap 18 of the present invention is preferably used in combination with the illustrated canning jar 10 and ring 16, it should be understood that the inventive insect trap 18 may be used in combination with any suitable open mouthed receptacle, for example, a large bucket.

Insect trap 18 comprises, in part, two separate members, a cap member 20 and core member 22, for easy properly aligned assemblage with each other.

Figure 2:
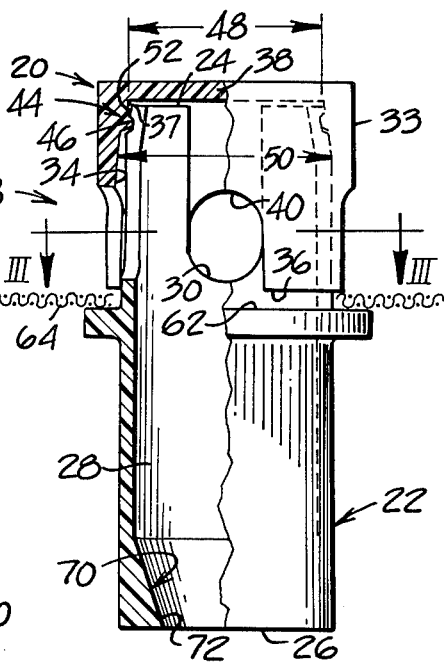
FIG. 2 is a side, blown-up view of the present invention partially sectioned.

Referring to FIG. 2, core member 22 is a tubular body with a first, usually open, end 24 and an open second end 26. As herein further described, the interior of core member 22 defines a passageway 28 for insects to enter the receptacle 10. Core member 22 is preferably formed of an opaque material, more preferably of a plastic such as polyvinyl chloride appropriately dark colored so that core member 22 may be inexpensively manufactured.

Figure 3:
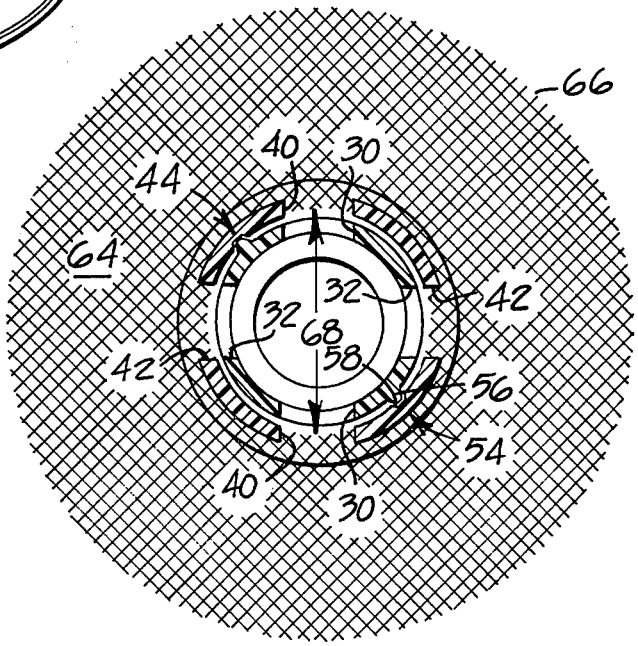
FIG. 3 illustrates a view, taken along III, as in FIG. 2.

Core member 22 must include at least one pair of opposed orifices, best illustrated by FIG. 3 and preferably includes two or more pairs of opposed orifices, e.g., the two orifices 30,32. Orifices 30,32 are of a sufficient size to admit an insect therethrough and thence into passageway 28. When for example the insect trap 18 is to be used for trapping houseflys, orifices 30,32 would preferably be about 5/16" across.

Referring to FIG. 2, cap member 20 defines skirt 33 and includes an interior cylindrical bore 34. Bore 34 is open at one end 36 and usually closed at the other end 37 by a wall 38.

Cap member 20 must include at least one pair of orifices 40, and preferably includes two or more pairs of opposed orifices, e.g., orifices 40,42. Orifices 40,42 must also be of a sufficient size to admit an insect therethrough and preferably are about 5/16" across. Cap member 20 is preferably formed of an opaque material, more preferably of a plastic appropriately dark colored such as polyvinyl chloride so that cap member 20 may be inexpensively manufactured. As illustrated by FIGS. 1 and 2, and herein-below further described, orifices 30,32 and 40,42 are alignable, or placeable in registration, so that a clear line of sight with respect to the horizontal is presented through the orifices 30,32 and 40,42. When both the cap member 20 and core member 22 are formed of the preferred opaque material, such a horizontally clear line of sight through orifices 30,32 and 40,42 is thereby optically framed by the skirt 33 of cap member 20, and it is believed such framing may assist in guiding insects through one pair of aligned orifices and into the passageway 28.

Again referring to FIG. 2, the present invention further comprises detent means 44. Detent means 44 holds the core member 22 when core member 22 is slidingly fully received into bore 34. Detent means 44 is carried by the cap member 20 adjacent the bore other end 37 and the core member 22 adjacent the first end 24. Any of a number of equivalent detent means 44 can be used In the particular embodiment illustrated in the drawings of FIG. 2 detent means 44 preferably comprises an annular member 46 extending into the bore 34 so that the annular member forms an inner diameter 48 and an outer diameter 50 for bore 34. Detent means 44 then further comprises a radially inwardly sloped portion 52 which comprises the termination of the core member first end 24. Portion 52 slopes radially inwardly to define a diameter substantially equal to, and preferably slightly larger than, the inner diameter 48. Hence, as the core member first end 24 is slidingly received through bore 34, first end 24 is slightly compressed by annular member 46 and snapped into the inner diameter 48, wherein core member 22 is releasably held within cap member 20.

The best mode contemplated for the present invention is that the detent means 44 further includes registration means 54 for aligning orifices 30 with orifices 40, and orifices 32 with orifices 42. In the particular embodiment illustrated by FIG. 3, registration means 54 comprises guide members. The guide members may comprise, for example, an axially extending ridge 56 closely ridable in a corresponding channel 58.

As illustrated by FIG. 3, ridge 56 is carried by core member 22 and channel 58 is carried by cap member 20 along the bore 34 surface; however, it should be understood that the opposite carrying is also hereby with the scope of the present invention.

When registration means 54 comprises guide members such as ridge 56 and channel 58, and the core member end 24 is slidingly received through bore open end 36, a person so assemblying insect trap 18 can very easily feel whether and when ridge 54 is received into channel 58, then can continue to slide bore member 22 until fully received into cap 20, wherein orifices 30,40 will be properly aligned. That is, a handicapped person, particularly a person within little or no visual acuity, may readily and correctly assemble and align the present invention. Further, assembly is quite rapid due to the built in detent means 44 which provides alignment and snap in features.

The present invention further comprises means for suspending the assembled core and cap members 20,22 within the mouth 12 of receptacle 10, wherein the suspending means 60 also prevents insect passage out of receptacle 10 except through passageway 28.

Suspending means 60 may comprise shoulder 62 which is carried by and outwardly extends to form a shoulder from core member 22 adjacent the bore open end 36 when cap and core members 20,22 are assembled. Shoulder 62 may be of a diameter substantially equal to or slightly greater than the diameter of receptacle 10 at mouth 12 so that flange member 62 may rest upon mouth 12 and hence suspend the assembled core and cap members 20,22 in mouth 12 (not illustrated).

However, the preferred embodiment form suspending means 60 is that shoulder 62 is of a diameter substantially the same as, or more preferably slightly larger than, the diameter of skirt 33. In this preferred embodiment, suspending means 60 then further comprises a screen member 64 with a periphery 66 adapted to conform to mouth 12. For example, when periphery 66 is of substantially the same diameter or slightly less than the mouth 12, screen member 64 may be firmly but releasably secured to receptacle 10 by conventional fastening means such as sealing ring 16. Screen member 64 may be formed of a variety of materials, so long as it is sufficiently rigid to suspend the assembled cap and core members 20,22 within mouth 12. For example, screen member 64 may be formed of metallic mesh, wherein the mesh size is sufficient to prevent passage of the insects desired for trapping therethrough.

Screen member 64 includes a hole 68 of sufficient size for closely receiving core member 22 therein adjacent shoulder 62. Thus, when cap and core members 20,22 are fully assembled and held in such assemblage via detent means 44, screen member 64 is positively sandwiched between and held by shoulder 62 and cap member 20. No taping, gluing or the like is required to hold the cap member 20 and core member 22 to the screen member 64.

The insect trap 18 of the present invention, having been assembled in combination with receptacle 10 as above described, provides that cap member 20 extends outwardly from the receptacle 10 so as to be beyond the receptacle mouth 12, and core member 22 extends into the receptacle 10 a predetermined distance. The suitable initial lure for attracting the desired insects is placed in receptacle 10 before the assembly. The screen member 64, passageway 28, and orifices 30,40 (and 32,42) permit the lure odor to freely waft from the receptacle 10. The desired insects to be trapped, for example houseflys, which are believed to utilize sight as well as smell, are attracted both by the lure odor, as well it is believed by vision through orifices 30,30 and 32,42 because of the clear, unobstructed horizontal line of sight. Once in passageway 28, the insects are freely guided into receptacle 10. However, once in receptacle 10, a sight view directed back into passage 28 is blocked by wall 38, which is preferably opaque and prevents light from acting as a guidance for escape. Further, when the suspending means 60 includes screen member 64, both light and odors are freely exchanged at the suspending means interface. Also, the open second end 26 of the core member 22 may be preferably taper as illustrated at 70 to form a reduced mouth 72 thus further obstructing the insect's view of the orifices 30, 40, and 32,42. Substantially all of the insects trapped do not escape, but simply expire within receptacle 10.

Figure 4:
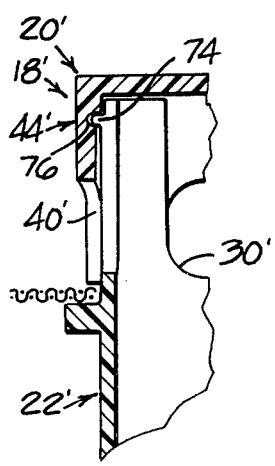
FIG. 4 illustrates in partial front section view an alternate embodiment of the present invention.

Adverting to FIG. 4 one can see another embodiment of the present invention. A trap 18' is shown which comprises a cap member 20' and a core member 22'. The cap member 20' and core member 22' resemble the cap member 20 and core member 22 of the embodiment of FIGS. 1-3 with the exception of the differences set out herein.

Basically in the embodiment of FIG. 4, a detent means 44' comprises one or more nubs 74, generally one nub between each of the orifices 30', and a plurality of indentations 76, generally in one-to-one relation with the nubs 74. The indentations 76 and nubs 74 are positioned to snappingly mate with each other when the core member 22' is fully inserted within the cap member 20'. It will be noted that the detent means 44', like the detent means 44 of FIGS. 1-3 serves to hold the core member 22' within the bore 34' of the cap member 20 and also serves for aligning the respective orifices 30', 40', etc. in a very rapid manner and even if the person assembling the trap 18' is not sighted.

In summary an inexpensive, quickly and easily assembled, yet sturdy and not easily accidentally dislodgable insect trap is provided by the present invention.

While the invention has been described in connection with the specific embodiments thereof, it will be understood that it is capable if further modification, and this application is intended to cover any variations, uses or adaptations of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An insect trap capable of being assembled with a receptacle having an open, receptacle mouth comprising;
    a tubular core member extending between a first end and a second end, at least said second end being open, said core member having at least one pair of opposed core member orifices adjacent said first end and a shoulder spaced between said ends and outwardly extending from said core member, said core member defining a longitudinally extending passageway therein in communication with said second end and said core member orifices;
    a cap member with a skirt and an interior, longitudinally extending bore, said bore having a one end and an other end, at least said one end being open, said cap member having at least one pair of opposed cap member orifices in communication with said bore, said first end of said core member adapted to be slightly received through said one end of said bore into an assemblage position with said shoulder of said core member proximate said skirt of said cap member and with said passageway of said core member extending a predetermined distance beyond said bore one end;
    a wall closing at least one of said first end of said core member and said other end of said bore;
    detent means for holding said first end of said core member in said assemblage position and for aligning said at least one pair of said cap member orifices with said at least one pair of said core member orifices; and,
    a screen member with a periphery adapted to be conformed and secured to the open, receptacle mouth, said screen member having a hole adapted to be fitted about said core member with said screen member sandwiched between said shoulder of said core member and said skirt of said cap member, with said cap member extended above said open, receptacle mouth and with said passageway of said core member extended into the receptacle, when said first end of said core member is in said assemblage position.

2. The insect trap of claim 1 wherein the detent means includes:
    at least one axially extending ridge member and at least one corresponding axially extending channel member mateable with the at least one ridge member, said at least one ridge and channel members carried by a respective each of the cap member along the bore and the core member first end.

3. The insect trap of claim 1 wherein the detent means further comprises:
    an annular member with an inner diameter and an outer diameter, the annular member adjacent the bore other end, the outer diameter substantially equal to the bore diameter; and,
    a radially inwardly sloped portion at the core member first end, the portion terminating with a diameter substantially equal to the annular member inner diameter, the sloped portion slidable along the annular member between the outer diameter and the annular member inner diameter and snappable into the annular member inner diameter.

4. The insect trap as in claim 1 wherein the cap member and core member are formed of opaque materials.

5. The insect trap as in claim 4 wherein the at least one pair of cap member orifices and the at least one pair of said core member orifices are of sufficient size to admit a house fly.

6. The insect trap as in claim 1 wherein said detent means includes at least one nub and at least one corresponding indentation, said at least one nub and indentation snappingly mateable with each other, said at least one nub and indentation carried by a respective each of said cap member along said bore and said core member first end.

* * * * *